(12) United States Patent
Simmons

(10) Patent No.: US 9,815,151 B2
(45) Date of Patent: Nov. 14, 2017

(54) BOX COLUMN ASSEMBLY

(71) Applicant: ConXtech, Inc., Pleasanton, CA (US)

(72) Inventor: Robert J. Simmons, Hayward, CA (US)

(73) Assignee: ConXtech, Inc., Pleasanton, CA (US)

( * ) Notice: Subject to any disclaimer, the term of this patent is extended or adjusted under 35 U.S.C. 154(b) by 0 days.

(21) Appl. No.: 14/618,925

(22) Filed: Feb. 10, 2015

(65) Prior Publication Data

US 2015/0217413 A1 Aug. 6, 2015

Related U.S. Application Data

(63) Continuation of application No. 13/459,134, filed on Apr. 28, 2012, now Pat. No. 8,950,648.
(Continued)

(51) Int. Cl.
*B23K 37/00* (2006.01)
*B23K 37/053* (2006.01)
*B23K 31/02* (2006.01)

(52) U.S. Cl.
CPC .......... *B23K 37/0538* (2013.01); *B23K 31/02* (2013.01); *B23K 37/0533* (2013.01);
(Continued)

(58) Field of Classification Search
CPC ............ B23K 2201/28; B23K 2201/06; B23K 37/0217; B23K 37/0443
See application file for complete search history.

(56) References Cited

U.S. PATENT DOCUMENTS 2,008,087 A 7/1935 Stromberg
2,641,829 A 6/1953 Sasso
(Continued)

FOREIGN PATENT DOCUMENTS

FR 1514258 A 2/1968
GB 1204327 A 9/1970
(Continued)

*Primary Examiner* — Erin Saad
(74) *Attorney, Agent, or Firm* — Kolisch Hartwell, P.C.

(57) ABSTRACT

Apparatus for assisting in weld assembling a box column from a tack-welded pre-assembly of planar plate components. The apparatus features (1) an elongate frame defining a rotational-assembly axis, and (2) plural pre-assembly-receiving, rotational support structures mounted at spaced locations on the frame—each support structure including (a) an openable/closable yoke possessing a collar-reception zone, (b) an openable/closable collar rotatably receivable within this reception zone, and possessing a central throughpassage having a cross-sectional configuration which is larger than that of a box-column which is to be assembled, and (c) a pair of removably-collar-attachable, throughpassage clamping shoes for forming cooperatively, within the collar throughpassage, a window for complementarily, receiving extension therethrough of a box-column pre-assembly's cross section. A so received pre-assembly is rotatable about the rotational-assembly axis to position the existing seams of adjacency between the pre-assembly plate components for full-strength welding by an automated, traveling welding instrumentality.

6 Claims, 5 Drawing Sheets

Related U.S. Application Data

(60) Provisional application No. 61/483,647, filed on May 7, 2011.

(52) U.S. Cl.
CPC .......... *Y10T 29/53* (2015.01); *Y10T 29/53539* (2015.01); *Y10T 29/53548* (2015.01)

(56) References Cited

U.S. PATENT DOCUMENTS

| | | | |
|---|---|---|---|
| 3,085,148 A | 4/1963 | McConnell | |
| 3,629,931 A | 12/1971 | Stanley | |
| 3,653,115 A | 4/1972 | Perkins | |
| 3,824,661 A | 7/1974 | Dobson et al. | |
| 3,845,538 A | 11/1974 | Demler, Sr. | |
| 3,845,930 A | 11/1974 | Metrailer | |
| 3,848,863 A | 11/1974 | Owen | |
| 3,877,129 A | 4/1975 | Dobson et al. | |
| 3,940,105 A | 2/1976 | Metrailer | |
| 4,014,089 A | 3/1977 | Sato et al. | |
| 4,018,057 A | 4/1977 | Erzen et al. | |
| 4,019,298 A | 4/1977 | Johnson, IV | |
| 4,131,048 A | 12/1978 | Dickes | |
| 4,148,467 A | 4/1979 | Sargeant | |
| 4,353,154 A | 10/1982 | Wagner | |
| 4,480,383 A | 11/1984 | Yoshioka et al. | |
| 4,494,431 A | 1/1985 | Niswonger | |
| 4,497,100 A | 2/1985 | Wagner | |
| 4,584,918 A | 4/1986 | Stubbe et al. | |
| 4,629,408 A | 12/1986 | Giron et al. | |
| 4,893,393 A | 1/1990 | Marshall | |
| 5,098,005 A | 3/1992 | Jäck | |
| 5,112,183 A | 5/1992 | Nusbaum et al. | |
| 5,206,980 A | 5/1993 | Chapman | |
| 5,244,300 A | 9/1993 | Perreira et al. | |
| 5,248,078 A | 9/1993 | Deal et al. | |
| 5,289,665 A | 3/1994 | Higgins | |
| 5,355,576 A | 10/1994 | Miller | |
| 5,678,375 A | 10/1997 | Juola | |
| 5,727,778 A | 3/1998 | Nodar | |
| 5,904,347 A * | 5/1999 | Lin | B23K 37/0452 269/296 |
| RE36,541 E | 2/2000 | Rossi | |
| 6,082,070 A | 7/2000 | Jen | |
| 6,092,347 A | 7/2000 | Hou | |
| 6,322,061 B1 | 11/2001 | Maser et al. | |
| 6,367,788 B1 | 4/2002 | Babchuk | |
| 6,431,535 B1 | 8/2002 | Volpe | |
| 6,837,016 B2 | 1/2005 | Simmons et al. | |
| 6,921,011 B1 | 7/2005 | Mangelsen et al. | |
| 7,036,202 B2 | 5/2006 | Lorenz | |
| 7,051,917 B2 | 5/2006 | Simmons | |
| 7,051,918 B2 | 5/2006 | Simmons | |
| 7,076,852 B2 | 7/2006 | Penman et al. | |
| 7,127,863 B2 | 10/2006 | Simmons | |
| 7,621,099 B2 | 11/2009 | Simmons | |
| 7,716,820 B2 | 5/2010 | Simmons | |
| 7,837,084 B2 | 11/2010 | Simmons | |
| 7,908,725 B1 | 3/2011 | Irish et al. | |
| 7,941,985 B2 | 5/2011 | Simmons | |
| 8,205,312 B2 | 6/2012 | Simmons | |
| 8,496,237 B2 | 7/2013 | Rolle | |
| 2001/0017292 A1 | 8/2001 | Belloni et al. | |
| 2002/0005397 A1 | 1/2002 | Bong et al. | |
| 2002/0083607 A1 | 7/2002 | Atsuhiko et al. | |
| 2003/0041549 A1 | 3/2003 | Simmons et al. | |
| 2004/0139683 A1 | 7/2004 | Simmons | |
| 2005/0055954 A1 | 3/2005 | Simmons | |
| 2006/0110215 A1 | 5/2006 | Holscher | |
| 2007/0256288 A1 | 11/2007 | Vermaat | |
| 2008/0245021 A1 | 10/2008 | Simmons | |
| 2010/0192346 A1 | 8/2010 | Simmons | |
| 2010/0313400 A1 | 12/2010 | Simmons | |

FOREIGN PATENT DOCUMENTS

| | | |
|---|---|---|
| GB | 2385817 A | 9/2003 |
| JP | 61-219481 A | 9/1986 |
| JP | 6-81394 A | 3/1994 |
| JP | 7-150635 A | 6/1995 |
| JP | 8-144370 A | 6/1996 |
| JP | 2003-253758 A | 9/2003 |
| JP | 2004-11377 A | 1/2004 |
| WO | 9836134 A1 | 8/1998 |

* cited by examiner

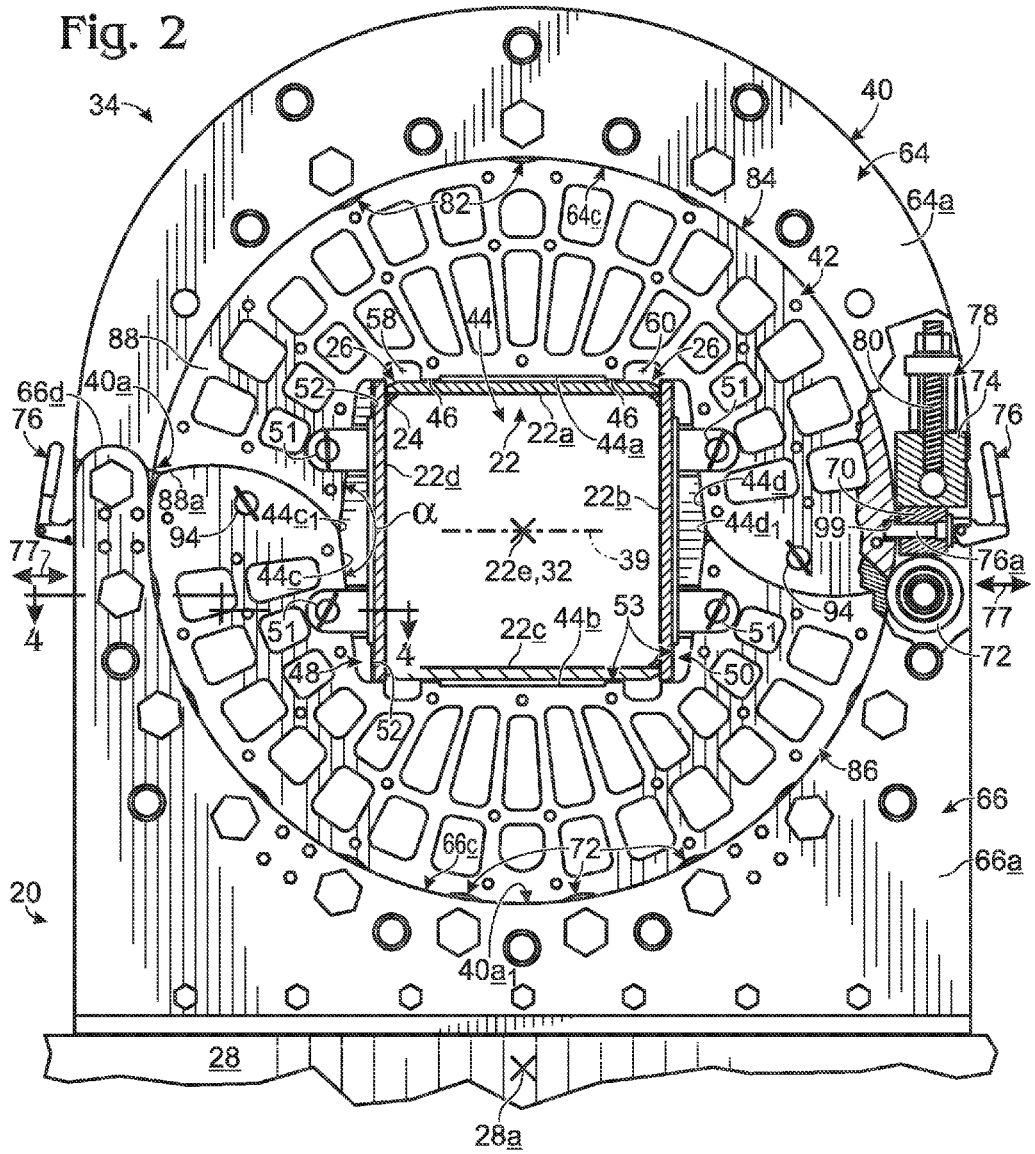

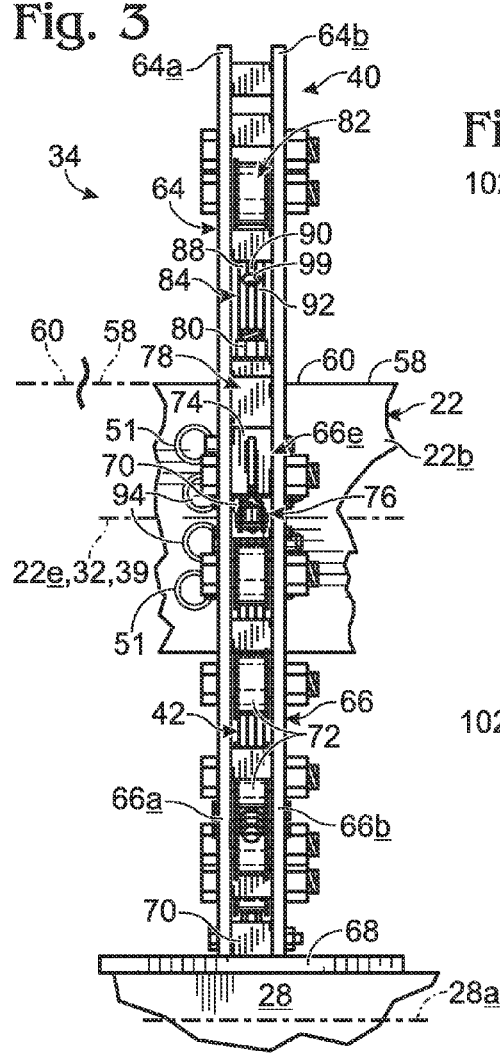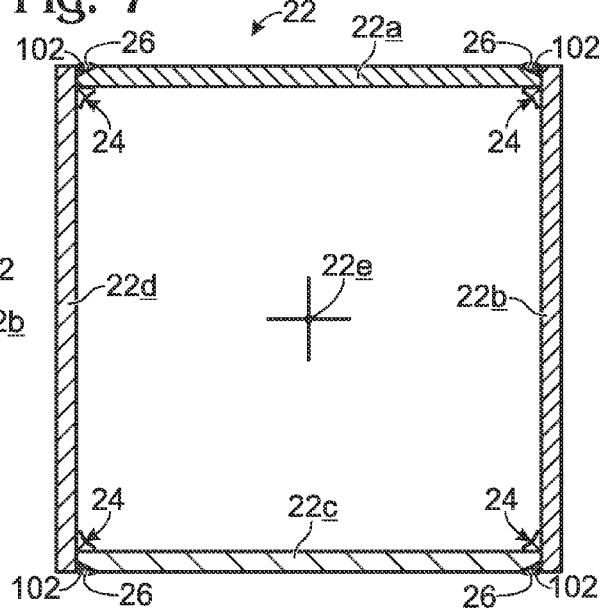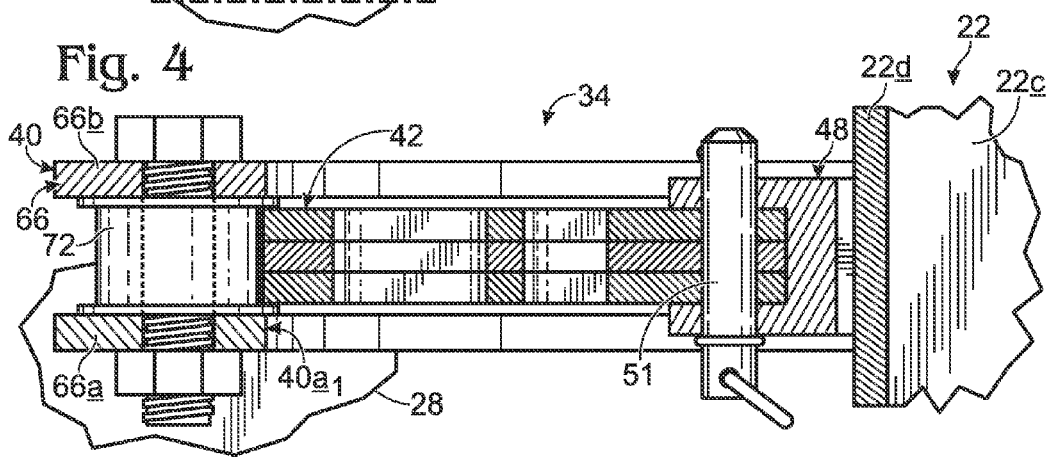

BOX COLUMN ASSEMBLY

CROSS REFERENCE TO RELATED APPLICATIONS

This application is a continuation of U.S. patent application Ser. No. 13/459,134, filed Apr. 28, 2012, which claims priority from U.S. Provisional Patent Application Ser. No. 61/483,647, filed May 7, 2011, for "Column-Component Weld-Assembly Jig Apparatus and Methodology". The complete disclosures of each application are hereby incorporated by reference in their entireties for all purposes.

BACKGROUND AND SUMMARY OF THE INVENTION

This invention pertains to apparatus for assembling, by welding, from individual, elongate plate components, an elongate, hollow-form, rectangular-cross-section box column. For illustration purposes herein, a preferred and best-mode embodiment of the invention is described in conjunction with assembling a square-cross-section box column of the type intended for use in a structural building frame—an application wherein the invention has been determined to offer particular utility.

The proposed assembly apparatus receives a pre-assembly of the elongate plate components that are to be made up into such a column—for example, a preliminarily tack-welded plate-component pre-assembly, having a long, central axis—and, employing plural (at least two), specially constructed, longitudinally spaced, pre-assembly-circum-surrounding, openable/closable, rotational support closure structures, cooperatively holds this preassembly in a generally horizontal position for selective rotation to different, temporarily stabilized angular positions about its long axis for full-welding unification through robust, fill-strength, column-finishing welds that are created along the adjacent long edges of the pre-assembled components. Preferably, though not necessarily, these column-finishing welds are performed by an automated, essentially continuously traveling welding instrumentality which moves along the lengths of the preassembled plate components in a manner uniquely unimpeded, and freely accommodated, by the rotational support structures that form parts of the assembly apparatus. Travel clearance for welding-instrumentality movement successively past the rotational support closure structures is accomplished, according to the invention, by a permitted "opening" of selected portions of the closure structures—an action which is accomplished without compromising in any way configurationally stable continuous supporting of the pre-assembly components.

In such an arrangement, it is, of course, important that the pre-assembly components be supported with assured configurational stability during the full-welding-assembly procedure. It is also important that these components, in their pre-assembled form, and during welding, (a) be rotatable as a unit about what will become, when full welding assembly is completed, and what already effectively is in the component pre-assembly condition, the resulting assembled-column's long axis, so as to accommodate the easy forming and development of the required elongate, inter-component welds along the entire length of the pre-assembly, and (b) be supported in a manner which permits an automatic, or hand-operated, traveling welding instrumentality to move, preferably with non-stop continuity, past the rotational support closure structures which support the preassembled components during the process. Such rotation during welding helps, inter alia, to balance and minimize potential heat-induced warping distortion.

In order to enable the practice of accommodating non-stop continuity welding, the rotational support closure structures are specially formed so as to be selectively partially openable without disturbing the required maintenance of the stable positional relationships that have been established between the pre-assembly components.

In this context, and from one point of view of the invention, its proposed apparatus features (1) an elongate, substantially horizontal frame possessing a substantially horizontal, rotational-assembly axis, (2) at least a pair of box-column pre-assembly rotational support structures, or rotational support closure structures, mounted at spaced locations on the frame, designed to receive, and to furnish support for rotation about the rotational-assembly axis for, such a pre-assembly. Each support structure includes, in respective conditions operatively centered on the apparatus' rotational-assembly axis, (a) an openable/closable, dual-section yoke defining an openable/closable, generally circular, collar-reception zone which, with the yoke closed, is circular in configuration, (b) an openable/closable, dual-section collar, which is circular in perimetral outline when closed, and removably receivable, and rotatable effectively, within the yoke's circular collar-reception zone, this collar, when closed, possessing a central, non-rectangular through-passage which is defined by a first pair of opposite, straight-angle sides, and a second pair of opposite, outwardly-directed obtuse-angle sides, opening of the collar splitting, and opening up, its throughpassage, along a line connecting the vertices of its obtuse-angle sides, into two, equal and matching-configuration, wedge-shaped troughs, and (c) a pair of removably collar-attachable, double-wedge clamping shoes, one for each obtuse-angle side of the throughpassage, these shoes, when attached to the collar, and with the collar closed, forming, in cooperation with the collar's through-passage's straight-angle sides, a rectangular-outline window for confinedly, and complementarily, receiving extension therethrough of the rectangular-cross-section of a box-column pre-assembly in a condition with the pre-assembly's long, central axis substantially coincident with the apparatus' rotational-assembly axis.

This apparatus is designed specifically to handle such a pre-assembly of plate components having, in the pre-assembly, long, lateral, parallel, edges that define, collectively, plural, elongate, parallel, inter-plate-component, weld-awaiting interface seams, or valleys, and the yokes and collars are respectively configured whereby opening thereof is effective to expose, in a manner facing upwardly to accommodate welding access, a pair of such seams. As will be seen, each section in each dual-section yoke possesses at least a portion which is generally arcuate and semicircular in configuration, and in fact one of the two sections in each yoke is essentially entirely arcuate and semicircular in overall configuration. Somewhat similarly, each of the two sections in each dual-section collar is essentially entirely arcuate and semicircular in overall configuration. Further, each yoke and collar is structured to promote, during box-column assembling, cooperative openings thereof about, or very near, a particular, substantially horizontal plane disposed above the underlying frame.

Operatively associated with, and straddling, the frame in the apparatus of the invention is a basically conventional, traveling welding instrumentality having a pair of laterally spaced welding heads disposed appropriately above the frame, and an elongate track supporting the welding instrumentality for movement along a travel path paralleling the apparatus-included rotational-assembly axis, and for thereby guiding the welding heads along laterally spaced welding paths that are disposed, respectively, immediately overhead, and parallel to, any open-yoke and open-collar, upwardly exposed interface seams in any pre-assembly then supported by the rotational support structures.

These and other features and advantages that are offered by the invention will become more fully apparent as the detailed description thereof which follows below is read in conjunction with the accompanying drawings.

DESCRIPTIONS OF THE DRAWINGS

FIG. 1 is an isometric view, fragmentary in nature, generally illustrating the apparatus of the present invention designed for promoting the weld assembling of an elongate, structural-building-frame box column from a pre-assembly of elongate, adjacent, planar plate components. This figure includes an illustration of a typical, square-cross-section box-column pre-assembly stably supported in place in the apparatus.

FIG. 2 is a fragmentary, enlarged-scale, view, taken generally along the lines 2-2 in FIG. 1, showing certain details of a rotational support structure constructed in accordance with the present invention to include, as will be described below, (a) an openable/closable, dual-section, split-structure yoke, (b) an openable/closable, dual-section, split-structure, rotatable collar received for rotation within the yoke, and a pair of removably-collar-attachable, double-wedge, centrally located, laterally spaced clamping shoes. A portion of the structure shown in this figure has been broken away to illustrate certain aspects of internal construction.

This drawing figure also illustrates, in an axial, cross-sectional view, the same elongate, square-cross-section, box-column pre-assembly which is shown in FIG. 1 received within a generally complementarily shaped window—i.e., a window whose perimetral outline is, effectively, complementary with respect to the cross-sectional configuration of the illustrated box-column pre-assembly—this window being formed/defined in the pictured rotational support structure by structural and configurational collaboration between the illustrated collar and clamping shoes.

FIG. 3 is a same-scale, fragmentary side elevation taken generally from the right side of FIG. 2.

FIG. 4 is a downward looking, cross-sectional view taken generally along the lines 4-4 in FIG. 2, drawn on a somewhat larger scale than that used in FIG. 2.

Figure 5:
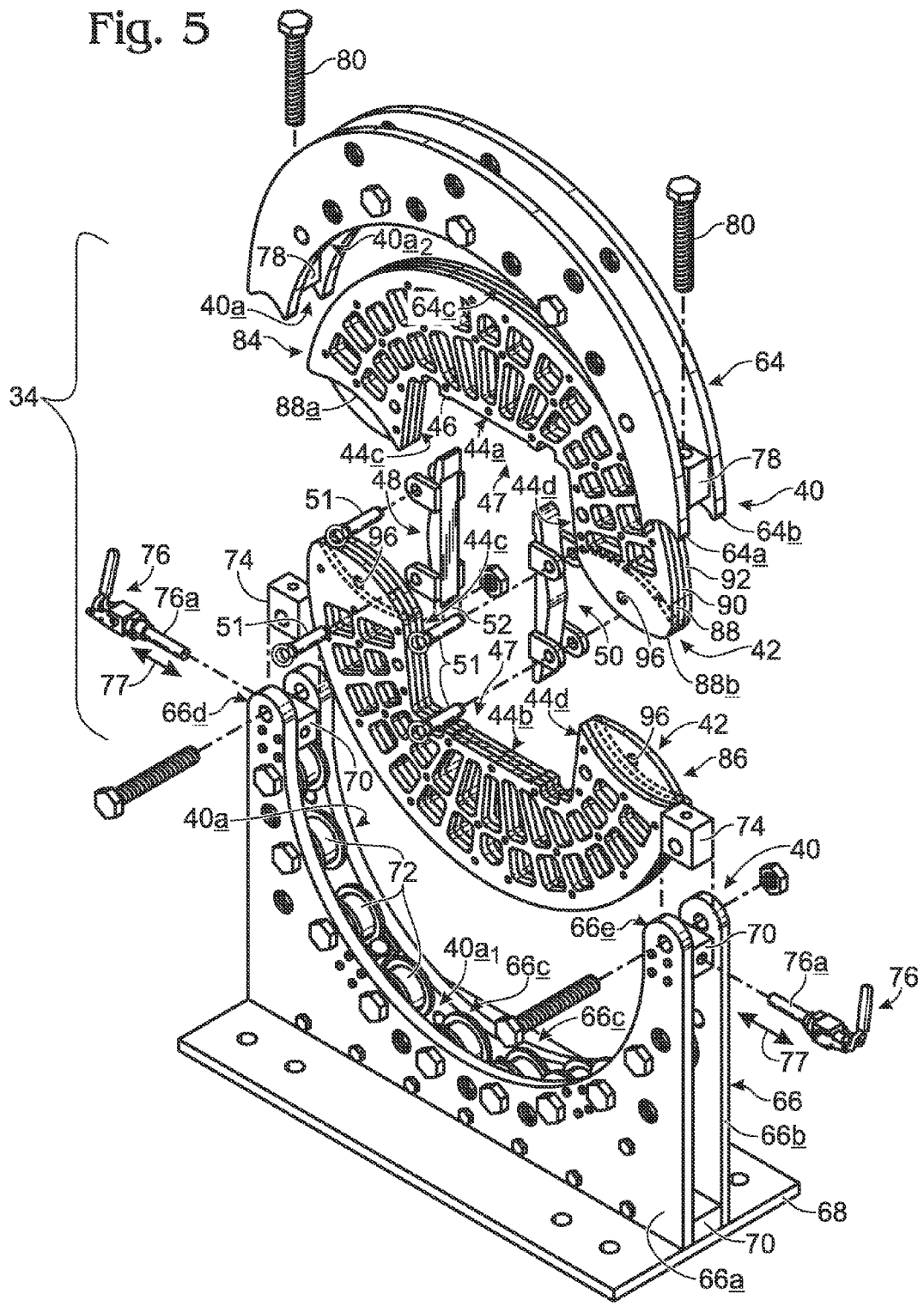

FIG. 5, which is drawn on a scale that is slightly smaller than the scale employed in FIGS. 2 and 3, is an exploded, isometric view of the rotational support structure illustrated in FIGS. 2-4, inclusive, presented in a condition isolated and removed from the frame in the apparatus of the invention. In this exploded view, a yoke and a collar in the pictured rotational support structure are shown in open conditions, i.e., with their respective upper and lower, selectively separable sections seen vertically separated.

Figure 6:
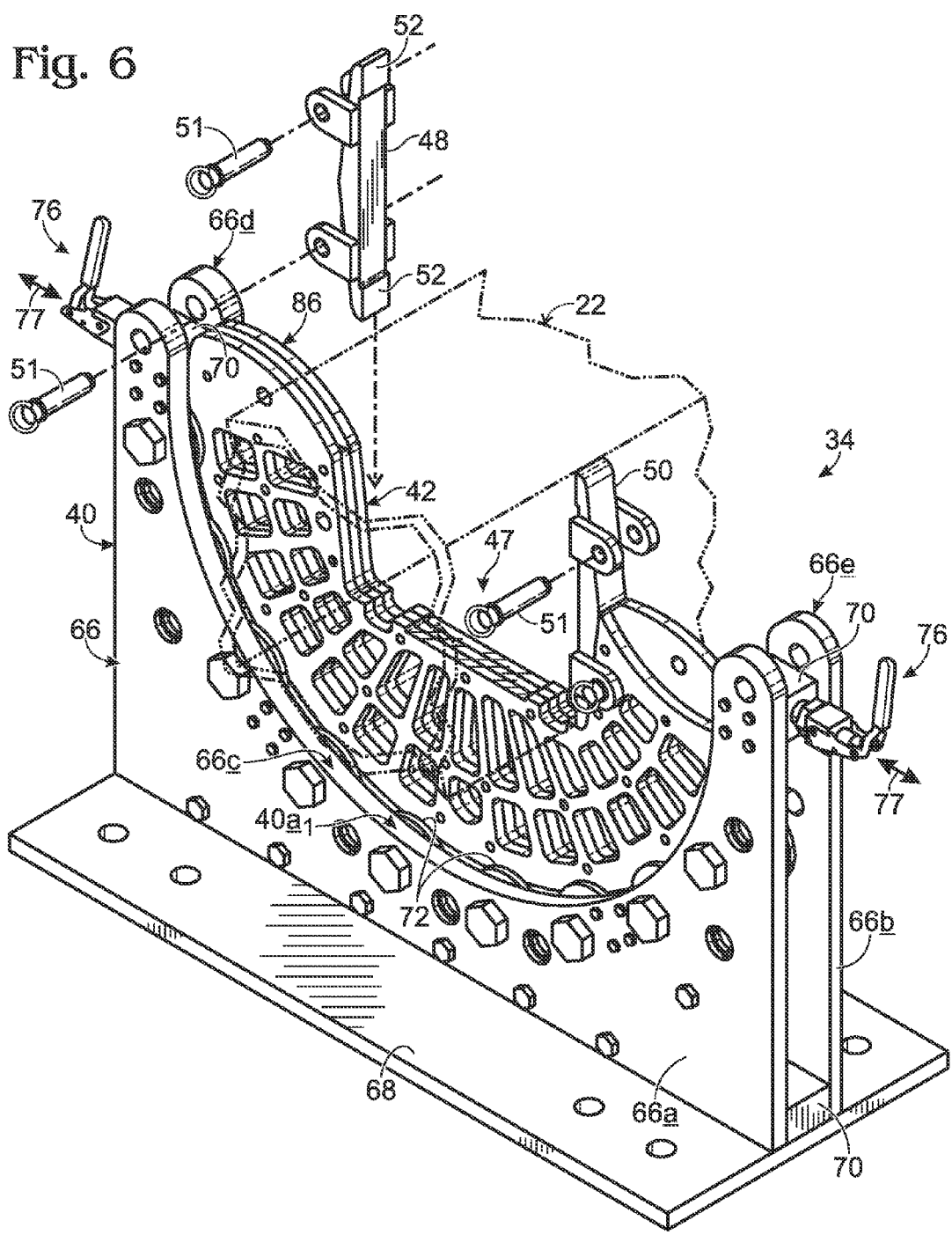

FIG. 6, on a slightly larger scale, is somewhat similar to the lower portion of FIG. 5, here presenting a partial view of the rotational support structure of FIGS. 2-5, inclusive, with one clamping shoe shown in place relative both to the lower section of the illustrated collar, and to the box-column pre-assembly mentioned above (here shown fragmentarily in dash-double-dot lines), much as that shoe is pictured in FIG. 2, and the other clamping shoe shown about to be put similarly into place.

Figure 1:
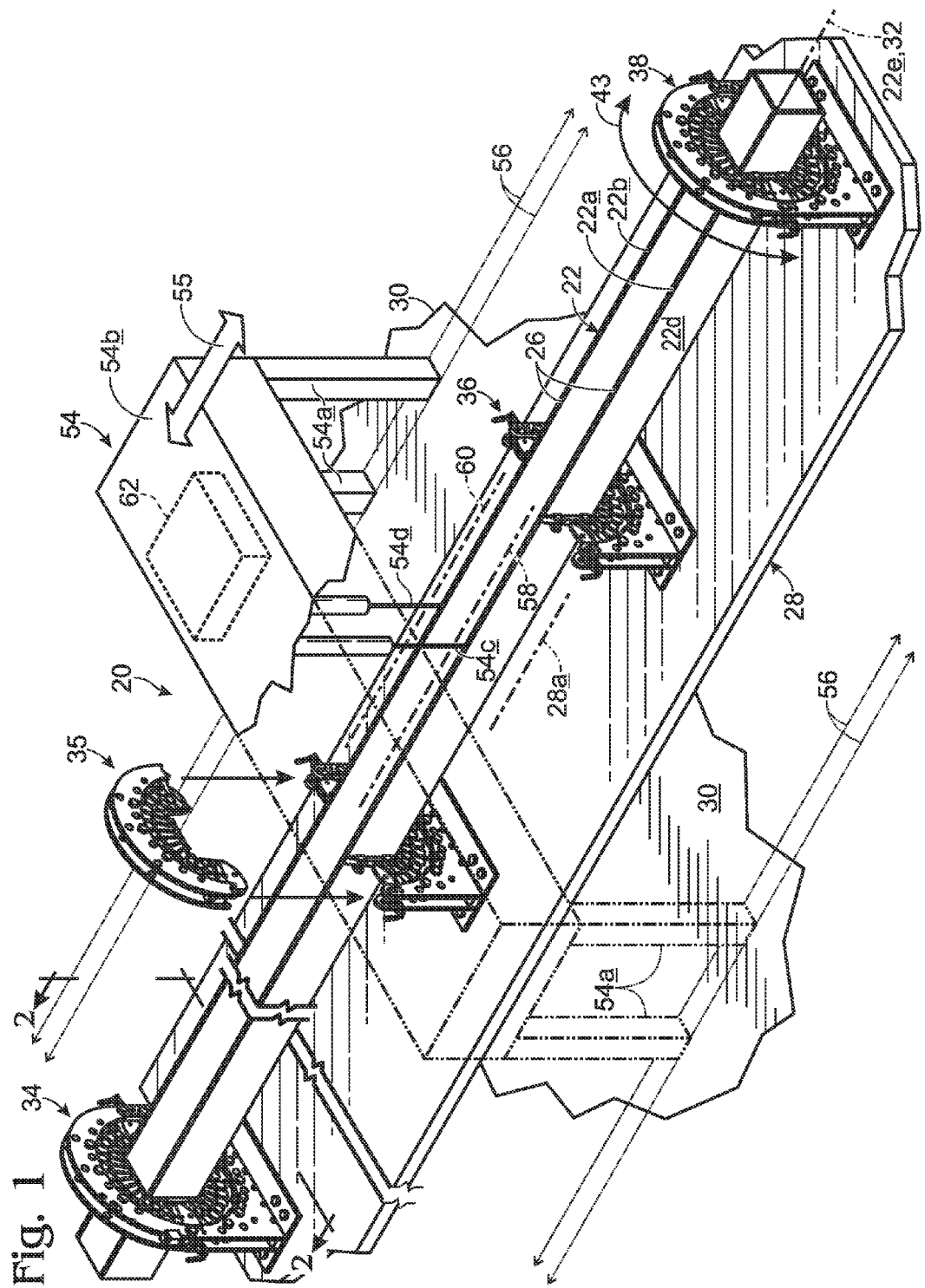

FIG. 7 is a large-scale endo, long-axial view illustrating one form (i.e., the same form as is illustrated in FIGS. 1-3, inclusive) of a completed, i.e., fully and finally weld-assembled, structural-building-frame box column which has been assembled utilizing the apparatus of FIGS. 1-6, inclusive. This illustration specifically relates to the box-column pre-assembly shown in FIG. 2.

DETAILED DESCRIPTION OF THE INVENTION

Turning now to the drawings, and referring first of all to FIG. 1, indicated generally at 20 is a preferred-embodiment, and best-mode form, of an apparatus constructed in accordance with the present invention for promoting the weld-assembling of an elongate, structural-building-frame box column from a rectangular-cross-section pre-assembly of elongate, adjacent, planar plate components. While apparatus 20 may be employed for the weld-assembling of structural-building-frame box columns having different kinds of rectangular cross sections, apparatus 20 herein is illustrated and described specifically for weld-assembling a box column having a square cross section.

Adding attention for a moment to FIGS. 2 and 3 along with FIG. 1, an illustrative box-column pre-assembly of what are referred to herein as elongate, adjacent, planar plate components is shown generally at 22. It includes four, substantially equal-size plate components 22a, 22b, 22c, 22d which, in pre-assembly 22, have been tack-welded into an appropriate, square-cross-section (also referred to generally as a rectangular-cross-section), box-column configuration through a plurality of small, internal tack-welded blocks, such as those shown at 24 in FIG. 2. Pre-assembly 22 includes a long, central axis 22e which is to become, eventually, the long, central axis of a finally assembled box column fabricated in accordance with practice of the invention utilizing apparatus 20. Pre-assembly 22 herein has a length of about 60-feet, and equal lateral dimensions, determined by the widths of the four, included plate components, of about 16-inches.

The plate components which make up pre-assembly 22 have laterally spaced, elongate, lateral edges, pairs of which, respecting right-angularly-adjacent plate components in the pre-assembly, lie parallel to and immediately adjacent one another to define, collectively in the pre-assembly, what are referred to herein as plural, elongate, parallel, inter-plate-component, weld-awaiting interface seams which take the form of elongate, weld-awaiting valleys, such as the two valleys shown generally at 26 in FIG. 2. As can be seen particularly well in the axial view of the pre-assembly presented in FIG. 2, these valleys exist by virtue of the existences of the chamfered lateral edges that are provided in plate components 22a, 22c. As will become apparent, in the employment of apparatus 20 during final full welding-assembly of a box column, adjacent pairs of these seams, such as the two seams that are specifically labeled 26 in FIG. 2, and as will be explained below herein, are preferably simultaneously welded. The terms "seam" and "valley" will be employed hereinafter interchangeably.

While a specific box-column pre-assembly, formed by a particular approach to tack-welding, is illustrated, and has just been described, herein, it should be understood that any appropriate form of generally stabilized pre-assembly formation modality is certainly employable. It should also be understood that different box-column sizes may readily be fabricated in accordance with the present invention simply by changing certain obvious structural parameters present in apparatus 20. For example, a box column which has a rectangular, but not-square, cross section may easily be fabricated. The detailed apparatus-componentry description which follows below will make readily evident to those skilled in the art just how to accommodate box-column size and configuration variations.

Apparatus 20 includes an elongate, substantially horizontal frame 28, of suitable design, which is appropriately supported on, for example anchored to, the floor of a factory, such as the factory floor which is shown fragmentarily at 30 in FIG. 1. Frame 28, whose details may be conventional, and not specifically important in relation to the invented features of apparatus 20, possesses a long, substantially horizontal axis 28*a*. While different, specific length-accommodating aspects of apparatus 20 are, of course, possible, at least in terms of the length of frame 28, in the apparatus now being described, frame 28 has an overall length of somewhat more than about 60-feet, and repositionably mounted on it are eight rotational support structures, only four of which are pictured herein in FIG. 1, spaced apart by about 8-foot intervals.

Importantly, and operatively, associated in apparatus 20 with, and disposed above, frame 28 is an elongate, substantially horizontal, rotational-assembly axis 32 which parallels frame axis 28*a*. It is in relation to axis 32 in apparatus 20, an axis which is effectively defined collaboratively by plural rotational support structures (and specifically by these structures' yokes and yokes-carried rotational collars) described immediately below, that rotational weld-assembling of a box column, from a box-column pre-assembly, such as from pre-assembly 22, is performed. It for this reason that, in FIGS. 1-3, inclusive, axes 22*e*, 32 are shown as being coincident.

Continuing with attention directed especially to FIGS. 1, 2 and 3, included in apparatus 20 are plural—at least two—rotational support structures (or rotational support closure structures as just mentioned above), such as the four such structures shown at 34, 35, 36, 38, which are repositionably mounted in any suitable manner on, and distributed in spaced relationship along, and extending upwardly from, frame 28. Structures 34, 38 are shown with their included yoke and collar structures (soon to be described) in closed conditions stably supporting pre-assembly 22. Structure 35 is shown in an open condition with all of its components visible in FIG. 1, i.e., in a condition about to be closed, or in a condition having just been opened. Structure 36 is shown in an open condition with its upper components removed from FIG. 1—a condition relevant to its preparing to accept for support a box-column pre-assembly, or to release and permit removal of a full-weld-completed box column. As mentioned, these rotational support structures define rotational-assembly axis 32.

The repositionability of these rotational support structures, which herein are spaced apart representationally by the above-mentioned distance of about 8-feet, is relevant to allowing one using apparatus 20 to locate these structures at what are considered by that user to be the most appropriate, box-column pre-assembly support locations for a box-column assembly procedure (still to be described). It will be understood that, while at least two of these rotational support structures will be required for any box-column assembly operation, any appropriate number greater than two, as determined by the apparatus user, may be employed. The 8-foot spacings just mentioned above between structures 34, 35, 36, 38 are merely illustrative herein. Other specific spacings, including dissimilar, successive spacings, may be determined to be more suitable for certain assembly procedures. The 8-foot spacings present in apparatus 20 are quite suitable to the box-column assembly modality which will be described shortly. Repositionable mounting on frame 28 for the rotational support structures is accommodated readily by (a) the conventional furnishing of appropriately, longitudinally distributed mounting locations in frame 28, and (b) by the availability of appropriate "matching" mounting "sites", such as throughbores, that are provided adjacent the bases of the rotational support structures.

These rotational support structures, with their several included components which will be described in greater detail shortly, play the role of supporting an elongate box-column pre-assembly in a stably supported condition, and for selected rotation about rotational-assembly axis 32 in a manner holding a plate-component pre-assembly in proper, selected, rotated orientations to allow for ready and convenient full-strength welding to take place, preferably in a longitudinally continuous manner, along the length of the pre-assembly respecting the seams between adjacent plate components. As will become apparent, and as will shortly be more fully explained, these rotational support structures are openable/closable structures, upper portions of the respective componentry sections (dual sections) in which may be removed and lifted relative to, and effectively and just generally about, a substantially horizontal plane 39 (see FIGS. 2 and 3), by lifting and removal to expose what is then the then upper side of a there-supported box-column pre-assembly for clear and unobstructed movement, preferably continuously, of a pair of welding heads along the pre-assembly, without there occurring any interference of such motion from any portion of a rotational support structure. As can be seen in FIGS. 2 and. 3, plane 39 is shown effectively containing illustrated axes 22*e*, 32.

Generally speaking, included in each rotational support structure, such as within representative rotational support structure 34 which is pictured in detail in FIGS. 2-6, inclusive, and recognizing that the several, illustrated rotational support structures are identical in construction, are what is referred to as an openable/closable, dual-section, split-structure yoke, or yoke assembly, 40, and, received and supported rotatably within a circular, collar-reception zone 40*a* in this yoke (see especially FIGS. 2 and 5), for selective, reversible rotation within that zone about rotational-assembly axis 32, is what is referred to herein as an openable/closable, dual-section, split-structure collar, or collar assembly, 42 which is circular in perimetral outline to fit rotatably properly within circular yoke zone 40*a*. Selective, reversible rotation of the collars, such as collar 42, is illustrated by double-headed, curved arrow 43 in FIG. 1

Still speaking in somewhat general terms, each collar, such as collar 42, when in its closed condition (as is illustrated especially well in FIG. 2 for collar 42), possesses, importantly, a central, non-square, non-rectangular throughpassage, such as throughpassage 44 which is indicated in FIG. 2—this throughpassage being defined by (a) what are referred to herein as opposed (and facing one another), spaced, substantially parallel, straight-angle sides, such as sides 44*a*, 44*b*, and by (b) a pair of spaced (and facing one another), opposed, obtuse-angle sides, such as sides 44*c*, 44*d*.

The two obtuse-angle sides 44*c*, 44*d* in throughpassage 44, each possessing a "central" obtuse angle α of about 170-degrees, are referred to herein as being outwardly directed, for the reason that the angular apices in these two sides, which apices are shown at 44*c*$_1$, 44*d*$_1$, respectively, in FIG. 2, point in opposite directions, laterally outwardly and away from the throughpassage. It will be noticed particularly FIG. 2 that, in the specific conditions shown therein for the componentry in rotational support structure 34, these two, obtuse-angle-side apices essentially lie within previously mentioned plane 39—a fabrication (full welding)-relevant condition which is helpful, as will become apparent, during employment of apparatus 20 in the implementation of full-welding assembly of a box column from a box-column pre-assembly, and very specifically under circumstances where, as appropriate and required, the relevant rotational support structure has been opened relative to plane 39 to allow for unimpeded welding-head travel past the location of that rotational support structure. As will also become apparent, and as can be seen clearly in FIG. 2, there are two rotated (about axis 32) conditions, 180-degrees apart, wherein this same, apices-positional "condition" exists.

With regard to the sizing illustrated in FIG. 2 for a throughpassage 44 herein, it will be observed that the spacing which exists between throughpassage, straight-angle sides 44a, 44b, and more specifically the spacing which exists between the small, opposing-facing (i.e., opposing from opposite sides 44a, 44b), flat-surfaces that are present in the slight, island-like projections included adjacent opposite lateral ends in those sides, two of such "same-side" projections being shown at 46 in throughpassage side 44a, under circumstances with collar 42 closed as shown, is essentially the same as the intended cross-sectional lateral dimension of a received box-column pre-assembly, such as that of pre-assembly 22. The opposing projections 46 which are formed on the two sections (upper and lower as illustrated in the drawings herein) in the collars, such as in collar 42, apply a slight stabilizing clamping pressure on opposite sides of a received pre-assembly.

By way of contrast, however, the spacing which exists between the two obtuse-angle sides of a throughpassage, as can be seen for sides 44c, 44d in throughpassage 44 in FIG. 2, is considerably greater than the intended cross-sectional lateral dimension of a received box-column pre-assembly, such as pre-assembly 22. The reason for this is to allow for easy insertion for processing of a box-column pre-assembly, and for later easy removal of a finished box column. In connection with this consideration regarding placement and removal of box-column componentry—both pre-assembly, and finished—within the throughpassages furnished in the collars received within the rotational support structures, those collar portions of each throughpassage which lie respectively on opposite sides of a line, or plane, passing through the apices in the obtuse-angle sides of the throughpassages are referred to herein as wedge-shaped troughs 47 (see particularly FIGS. 5 and 6).

Further included in each rotational support structure, such as within rotational support structure 34, are two collar-attachable, double-wedge clamping shoes, such as the two such shoes shown variously at 48, 50 in FIGS. 2, 4, 5 and 6. As can be seen in FIGS. 2-6, inclusive, these two clamping shoes, which are shown variously in these figures in conditions both releasably pinned, and releasably pinable, by manually manipulable detent pins 51, appropriately to the two sections still to be described in collar 42, include outer sides which are formed with essentially the same obtuse-angle shape which is been described above existing in throughpassage sides 44c, 44d, and inner, spaced, inwardly facing straight-angle sides, adjacent opposite lateral ends of which are formed small, flat-surfaced, island-like projections, such as the projections shown in FIGS. 5 and 6 at 52 in shoe 48. With shoes, such as shoes 48, 50, in conditions collar-attached, as shown in FIGS. 2 and 4, it will be evident that these clamping shoes effectively create, cooperatively with throughpassage straight-angle sides 44a, 44b, a generally square-cross-section, i.e., rectangular-outline, window (a corner of which is indicated by two, arrow-headed lines at 53 in FIG. 2) which, because of the presences of projections 46, 52, closes generally complementarily and confinedly around the cross-sectional configuration of a throughpassage-received box-column pre-assembly, such as pre-assembly 22.

Completing now a general, overall description of apparatus 20, included in the particular form and embodiment of this apparatus which is illustrated and described herein is an appropriately motor-driven, frame-28-straddling, traveling welding instrumentality which is shown generally in block form at 54 in FIG. 1. Instrumentality 54 which, as mentioned above, is generally conventional in construction, includes appropriate, vertical, leg-support structure 54a which supports its main body 54b immediately overhead frame 28 and above the rotational support structures mounted on that frame. Leg-support structure 54a specifically supports the entire welding instrumentality for movement reversibly (as indicated by a broad, double-headed arrow 55) along the length of frame 28 on suitable, elongate, frame-adjacent, linear tracks, or trackage, which tracks are represented schematically, and fragmentarily, by paired, dash—double-dot lines 56 in FIG. 1, and which tracks parallel frame axis 28a. Appropriate, and entirely conventional, track-traveling-and-engaging structure, such as non-illustrated wheels, is furnished appropriately adjacent the base of the leg-support structure to engage and ride on and along tracks 56.

Welding instrumentality 54 includes a pair of laterally spaced, conventional welding heads shown schematically at 54c, 54d in FIG. 1. Heads 54c, 54d are downwardly directed, and occupy vertical dispositions in the instrumentality, whereby their operational welding "ends" follow, and travel along, with movement the instrumentality, the two, laterally spaced paths shown by small cross marks 58, 60, respectively in FIG. 2, and by similarly labeled, dash-dot lines, respectively, in FIGS. 1 and 3. Paths 58, 60 extend overhead the rotational support structures, paralleling previously mentioned apparatus-associated axes 28a, 32, and specifically extend in elongate locations permitting full-assembly welding along upwardly exposed, adjacent-plate-component weld-awaiting interface seams, such as the previously mentioned seams 26 pictured in FIG. 2.

As was mentioned earlier herein, preferably, though not necessarily, substantially fully automated welding is performed in apparatus 20 during box-column assembly, and in conjunction with this preference, welding instrumentality 54 is operated principally under the control of a suitably algorithmically programmed, on-board digital computer, such as that which is represented in FIG. 1, schematically in dashed-outline block form, at 62. It should be understood, in this context of welding implementation, that, while automated-computer-controlled welding is a preference, a traveling welding instrumentality somewhat like instrumentality 54 could be employed in a manner operated by manual, rather than by computer, control, and further, that welding could also be performed, if desired, entirely by a hand-welding operation. Naturally, when computer automated welding is initiated utilizing instrumentality 54, appropriate ones, in an appropriate "succession order", of the rotational support assemblies are opened to allow for continuous-action welding clearance and access to a supported box-column pre-assembly. In apparatus 20 as it is illustrated herein, such opening of the rotational support structures is performed as a manual operation.

Directing attention now to FIGS. 2-6, inclusive, and considering the specific, preferred constructions of the various components that make up the rotational support structures, such as rotational support structure 34, these several figures essentially show, in great detail, and without requiring much companion descriptive text in order fully to inform those who are skilled in the relevant art how to build such a structure, both (a) the individual, preferred details of the constructions of the yoke, the collar and the clamping shoes in this support structure, and as well (b), tangentially associated other structural features that are operative collaboratively in each support structure.

With specific reference to rotational support structure 34, and beginning with a further discussion about yoke 40 which is structurally fully representative of the yokes included in each of the other rotational support structures, yoke 40 which, as was already mentioned, is a dual-section, split-structure assembly, possesses upper and lower sections 64, 66, respectively. Lower section 66, which includes, anchored to and rising from a horizontal foot plate 68, two, spaced, confronting and substantially matching-configuration plates 66a, 66b, effectively constitutes the base of yoke 40. The earlier-mentioned, generally arcuate and semicircular portion of lower yoke section 66 is very evident, and is marked at 66c in FIGS. 2, 5 and 6. Foot plate 68 in lower, base section 66 accommodates repositionable mounting of yoke 40, as desired, on apparatus frame 28.

Disposed appropriately between plates 66a, 66b are suitable spacer blocks, such as the blocks shown at 70 in FIGS. 2, 3, 5 and 6, and conventionally journaled for free rotation about respective horizontal axes on trans-plate-extending axles that extend between plates 66a, 66b are plural, flanged, idler rollers, such as rollers 72, that are distributed along the arcuate portion of section 66, as shown. The rotational axes furnished for these idler rollers parallel previously mentioned axes 28a, 32 when yoke 40 is appropriately mounted on frame 28. The flanges in rollers 72 effectively longitudinally "receive and capture" the perimetral edge of collar 42 when that collar is received, and resides for rotation, within the collar-reception zone, 40a, in yoke 40, and rollers 72 in lower yoke section 66 serve to define the lower, semicircular half $40a_1$ of reception zone 40a (see FIGS. 2 and 4-6, inclusive).

It will be apparent that a collar, such as collar 42, when closed and received simply within this just-mentioned lower half of the collar-reception zone in yoke 40, even with the yoke in an open condition, such as is illustrated in FIGS. 5 and 6 for the yoke, will be seated appropriately on rollers 72 in a manner permitting, if and when desired, free rotation of the collar on those rollers about rotational-assembly axis 32.

The two, laterally spaced, upwardly extending reaches 66d, 66e of the arcuate portion of lower yoke section 66 are through-apertured, as shown, to enable nut-and-bolt attachment thereto, between plates 66a, 66b, of a pair of laterally spaced, suitably, matchingly apertured blocks 74 (see FIGS. 2 and 5) which are used, as will be explained between yoke sections 64, 66, to accommodate bolted detachable attachment of upper yoke section 64 to lower yoke section 66. It is this bolt-attachment/detachment structure which is thus employed to enable selective opening and closing of a yoke, such as yoke 40. While such separating of the upper and lower yoke sections in order to accommodate opening and closing of the yoke is said to take place relative to and about previously mentioned horizontal plane 39, the upper and lower yoke sections, in the specific structural yoke configuration which is now being described, actually separate along a line or plane which is very closely adjacent (slightly above), but not necessarily absolutely coincident with, plane 39.

Functionally associated with lower yoke section 66, on opposite lateral sides of that section, and in further association with the upper, two, illustrated blocks 70, are lever-actuated, construction-evident, in-and-out anti-collar-rotation latch-pin structures 76 which are suitably mounted in place with respect to these just-mentioned, two, upper blocks 70 to enable the selective driving in and pulling out of included, elongate, cylindrical, axially shiftable latch pins 76a which, under manual control, shift, reversibly as illustrated by double-headed arrows 77, into and out of appropriate receiving bores (shortly to be described) that are distributed angularly (herein at 45-degree angular spacings) about the perimeter of collar 42 to enable selective locking (latching), against rotation, of that collar in different angular dispositions about axis 32, and, of course unlatching when desired.

Upper yoke section 64 includes two, spaced, confronting and substantially matching-configuration plates 64a, 64b which are essentially entirely arcuate and semicircular in configuration, thus giving this upper yoke section its mentioned, generally arcuate and semicircular configuration which is shown generally at 64c in FIGS. 2 and 5. Suitable, upper, spacer block assemblies, such as the two such block assemblies shown at 78 in FIGS. 2, 3 and 5, are appropriately disposed between plates 64a, 64b, and these block assemblies, 78, cooperate with previously mentioned blocks 74 in lower yoke section 66, and with vertically oriented bolts, such as those shown at 80, to enable opening and closing of yoke 40 via appropriate attachment and detachment of upper yoke section 64 relative to lower yoke section 66.

Conventionally journaled for free rotation about respective horizontal axes on trans-plate-extending axles that extend between plates 64a, 64b are plural, flanged, idler rollers, such as rollers 82, that are distributed along the arcuate configuration of section 64 as shown. The rotational axes furnished for these upper-yoke-section rollers parallel previously mentioned axes 28a, 32 when yoke 40 is closed and appropriately mounted on frame 28. The flanges in rollers 82 effectively longitudinally "receive and capture" the perimetral edge of collar 42 when that collar is received, and resides for rotation, within collar-reception zone 40a in yoke 40, and these rollers, 82, in the upper yoke section serve to define the upper, semicircular half $40a_2$ of circular collar-reception zone 40a.

Continuing with a description of rotational support structure 34, dual-section, split-structure collar 42 includes upper and lower sections 84, 86, respectively. Uses herein of the terms "upper" and "lower" in relation to collar 42 are uses that pertain to the particular, angular, rotational dispositions of collar 42, and of the other collars, as it (and they) are specifically pictured representationally in the drawings. As can clearly be seen in the relevant drawings, each of these collar sections, which sections are essentially identical in construction, has a generally arcuate and semicircular configuration, and is formed of three, identical, suitably face-to-face joined plates, such as plates 88, 90, 92 which are reference-numeral-marked in upper collar section 84 in FIG. 5. As can also be seen, one end of each of these plates has a generally concave edge profile, such as the illustrative concave edge profile shown at 88a in FIG. 5 for plate 88, and the opposite end, a generally convex edge profile, such as the convex edge profile shown at 88b also in FIG. 5 for plate 88. The plates are assembled into the two collar sections in such a manner that central plate 90 is reversed, end-to-end, in orientation relative to the two outer plates, 88, 92. A result of this end-to-end, reversal arrangement is that the opposite ends of the collar-section assemblies of plates exist with one end effectively including a slot between the ends of the outer, two plates, and the other end effectively including a projecting, central-plate-end tab, which, as can be seen clearly in the exploded view presented in FIG. 5, allows for tab and slot end-to-end-fitment uniting of the upper and lower collar sections to close the collar. Conventional, manually manipulable detent pins 94 (see FIGS. 2 and 3) cooperate with suitable accommodating throughbores in the collar sections, such as the throughbores shown at 96 (see FIG. 5), to enable coupling and decoupling of the two collar sections.

Formed, as by drilling, radially into the perimeter of collar 42 are plural, cylindrical sockets 99 (see FIGS. 2 and 3) sized appropriately to receive the latch pins, 76a, that are present in anti-rotation latch-pin structures 76. In the collar structure which is now being described, sockets 99, of which there are eight in all, are located (as mentioned earlier herein) at 45-degree angular intervals around the collar, although only four of them, at 90-degree, quadrature intervals (and two of them only at a time—at 180-degree intervals) are employed specifically during welding assembly of a box column to effect anti-rotation locking of a collar, and thus rotational stabilizing of a received and held box-column pre-assembly. The additional sockets are only tangential to the present invention. They are provided, for example, simply as a special convenience to enable support apparatus 20, if desired, to be employed, in a modified manner not involving the present invention, to assist in column-angular-rotational-position weld-attaching of various, potentially to be employed, external, column-side components, such as the two, different styles of column-to-beam, interconnect-promoting components illustrated, described, and discussed as being weld-attachment-handled, in the structural building frame environments described in U.S. Pat. Nos. 7,621,099, and 7,941,985, the entire disclosure contents of which patents are hereby incorporated herein by reference.

Completing a description of rotational support structure 34, included, as has been mentioned, within this structure, for removable fitment and attachment by previously identified, manually manipulable detent pins 51, adjacent the obtuse-angle sides, 44c, 44d of, and within, collar-defined, non-rectangular throughpassage 44, are the two, previously mentioned, double-wedge clamping shoes 48, 50. The common configurations of these two clamping shoes, and their sizes relative to the sizes of these obtuse-angle throughpassage sides, are quite evident from the drawings.

When these two shoes are appropriately "pinned" in place by detent pins 51 within throughpassage 44, individually to each of collar sections 84, 86, they define, collectively with straight-angle sides 44a, 44b in the throughpassage, the previously mentioned, generally square-cross-section capturing and confining window 53, one defined corner in which, as was earlier pointed out, is marked 53 in FIG. 2, for stably supporting, with slight clamping pressure, a box-column pre-assembly which extends through this window. The square cross-section window thus present is defined, very specifically, by the inwardly facing (generally toward rotational-assembly axis 32), small, flat surfaces (previously mentioned) included in projections 46 provided in the two collar sections, and in projections 52 provided in the shoes.

When the shoes are disengaged from the throughpassage, such being enabled by removal of detent pins 51, their disengagement exposes the full lateral dimensions of the previously mentioned wedge shaped troughs 47 to allow for easy insertion of a box-column pre-assembly, and later removal of a finished and finally fully weld-assembled box column. Attaching of these shoes to the collar sections in the collar via pins 51 takes place via insertion of these pins alignedly through previously mentioned throughbores 96 (see again particularly FIG. 5) provided in the collar sections, and through the throughbores pictured (but not specifically labeled) in the illustrated, short, laterally outwardly extending tabs that are seen (particularly in FIGS. 2, 5 and 6) attached to shoes 48, 50.

Describing now typical preparation and use of the apparatus of the invention, such as apparatus 20, a decision is first made regarding the size and cross-sectional character of a box column which is to be assembled. For example, where the intended box-column is to be typical of those that are employed in the most usual structural building frames, it will have (1) a square cross section of certain, predetermined, outside, lateral transverse dimensions, such as the 16-inch dimension mentioned earlier herein, and (2) a certain length, such as the earlier-mentioned 60-foot length. With respect to the intended, box-column, cross-sectional configuration, it will, of course, be important that the troughs 47 that are formed in the rotational-support-structure collars in apparatus 20 be shaped appropriately so that when they (the troughs) are upwardly facing and open, (a) they will each make a presentation like that which is shown in FIG. 1 for the there pictured, lower collar section of the collar in rotational support structure 36, and in FIG. 6 for the single trough 47 seen in this figure, and (b) will possess a lateral width effectively between their angularly outwardly splayed, opposite, obtuse-angle sides which will readily and freely accommodate easy placement of a box-column pre-assembly in them. Such "formation" of the collars to accommodate a particular style (i.e., cross section) of an intended box column and its associated pre-assembly is referred to hereinbelow as "collar sizing".

The frame in apparatus 20, naturally, must have an appropriate length, as must also the travel trackage provided along the frame for the traveling welding instrumentality which, initially, i.e., before the start of a weld-assembling operation, will be located appropriately adjacent one end of the apparatus frame, such as frame 28.

As was mentioned earlier herein, and as has just been suggested with respect to preliminary choices, it will usually be the case that an intended-to-be-assembled box column will have a square cross section, such as the square cross section which is shown herein for representative box column 22. If some special, cross-sectional rectangular shape which is non-square is to be assembled, the to-be-employed troughs' lateral dimensions will preferably be chosen to have widths slightly greater than the larger of the two lateral cross-sectional dimensions of such a column.

Another preliminary consideration involves determining where, and with what intervals, along the length of the apparatus frame, such as frame 28, to position, and then anchor in place, the rotational support assemblies (at least two) that are to be used.

With these preliminary apparatus-preparations taken into account, "correctly collar-sized" rotational support structures, in the selected number of them that are to be used, are mounted on the frame at the selected interval locations therealong, and the yokes and collars in all are opened, with the collars arranged so that their respective, "remaining-in-place", lower collar sections are disposed with troughs 47 facing straight up—open and exposed. All clamping shoes are removed so as fully to expose the splayed, angular widths of the troughs. The anti-rotation latch-pin structures are operated to lock the lower collar sections against rotation in the lower yoke sections.

A box-column pre-assembly, of the appropriate size is lowered into the upwardly facing, open troughs, preferably initially with a pair if seams 26 facing upwardly as in FIGS. 1 and 2, and the clamping shoes are returned, and initially partially reattached by detent pinning to the lower collar sections.

The presences of these now reattached clamping shoes, even without the presences yet of the upper collar sections and the upper yoke sections, furnish slight lateral clamping pressure on opposite lateral sides of a received box-column pre-assembly, and thus introduce desired lateral stabilization for a so-received pre-assembly.

Even now, without reclosing of the rotational support structures by reconnecting the upper collar sections and the upper yoke sections, and if it is desired that a welding-assembly operation take place under these circumstances, this is clearly one useful mode of implementing the supporting capability of apparatus 20. In other words, at this point in time, and with all of the yokes completely open, welding instrumentality 54 may now readily be advanced along the length of apparatus 20, with travel of this instrumentality, and operating of its two welding heads simultaneously, being suitably under the control of computer 62 to produce full-strength welds continuously in seams 26, and in an unobstructed manner respecting progress of the instrumentality along the box-column preassembly Another approach, of course, is for the rotational support structures, except perhaps that one which is most closely adjacent the beginning location of the welding instrumentality, to be closed initially to enhance stable holding of a box-column pre-assembly, with the welding instrumentality then advanced, again in a generally continuous manner along the length of the apparatus, with the appropriate, nearby rotational support structure opened at the right time as the welding instrumentality approaches the location of that structure. This practice might also involve not only successive, seriatim openings of rotational support structures, but successive, seriatim closures of rotational support structures which have just been passed by the welding instrumentality.

If it turns out that a box-column pre-assembly has initially been lowered into position in the troughs under circumstances where two seams 26 are not upwardly facing, then a typical practice will involve closure of all of the collars and yokes, and thus all of the rotational support structures, before any welding activity takes place, with the then completely length-supported preassembly first rotated about assembly-axis 32, and thus about its own long axis 22*e*, 90-degrees so as properly to orient such seams as a necessary precursor for the beginning of welding assembly.

When a complete, initial, singular, welding pass has been accomplished, typically (though not necessarily) all, or at least user-selected, appropriate ones, of the yokes and collars will be closed to provide stable support for the still not yet complete box-column, and the entire pre-assembly will then rotated 180-degrees about axes 22*e*, 32. This is done in apparatus 20 by a hand implemented rotational operation, of course, after freeing, by operations of latch-pin structures 76, of all of the collars for free rotation in the collar reception zones in the yokes, to the appropriate, new, 180-degree-adjusted, angular disposition about axis 32. In this new condition, anti-rotation latching again of the collars takes place to re-stabilize, against inadvertent rotation, the pre-assembly in its new angular orientation. This new angular orientation is one, of course, which exposes, upwardly for longitudinal welding, the opposite pair of seams 26 n the box-column pre-assembly.

When the seams in this new, second pair of seams have been welded, a completed box column is done, and FIG. 7 in the drawings shows such completion for box column 22 which has "emerged" from its precursor box-column pre-assembly 22. The four, full-strength finishing welds in seams 26 are shown here at 102.

The apparatus of the present invention is thus now fully described and illustrated, and several ways in which it may be used have also been discussed. While all of this is the case, I recognize that other variations and modifications, in both apparatus structure, and in its use, may come to the minds of those skilled in the relevant art, and it is my intention that the appended claims to invention will be interpreted with scopes which cover all such perceived variations and modifications.

I claim:

1. An apparatus for supporting a rectangular beam structure during a welding process, comprising
    a longitudinal frame structure defining a rotational axis, and
    a plurality of yoke structures spaced from each other along the rotational axis of the frame structure, each yoke structure containing a collar member, the collar member having a circular perimeter and an internal opening shaped to conform to the rectangular beam structure, and being rotatable inside the yoke structure about the rotational axis, each yoke structure including an upper yoke section and a lower yoke section connected to a fixed base, the upper and lower yoke sections being selectively coupled to each other at opposing lateral points near a horizontal plane, and each collar member including a pair of semi-circular collar sections,
    wherein each collar section is rotatable between a bottom position and a top position, and removable with the upper yoke section when the collar section is in the top position to expose upper corners of a beam while the beam is supported along sides and a bottom of the beam by the lower yoke section and the other collar section in the bottom position, wherein each collar section is comprised of identical face to face plates, each plate having a first end having a concave edge profile, and a second end having a convex edge profile, wherein each collar section includes a central plate sandwiched between two outer plates, the central plate having the first end sandwiched between the second ends of the respective outer plates, and having the second end sandwiched between the first ends of the respective outer plates.

2. The apparatus of claim 1, wherein collar sections are reversibly connected by engaging a convex end of a central plate with a slot created between convex ends of two outer plates of another collar section.

3. An apparatus for supporting a rectangular beam structure during a welding process, comprising
    a longitudinal frame structure defining a rotational axis, and
    a plurality of yoke structures spaced from each other along the rotational axis of the frame structure, each yoke structure containing a collar member, the collar member having a circular perimeter and an internal opening shaped to conform to the rectangular beam structure, and being rotatable inside the yoke structure about the rotational axis, each yoke structure including an upper yoke section and a lower yoke section connected to a fixed base, the upper and lower yoke sections being selectively coupled to each other at opposing lateral points near a horizontal plane, and each collar member including a pair of semi-circular collar sections, wherein each collar section is rotatable between a bottom position and a top position, and removable with the upper yoke section when the collar section is in the top position to expose upper corners of a beam while the beam is supported along sides and a bottom of the beam by the lower yoke section and the other collar section in the bottom position, wherein each collar member has a plurality of perimetral sockets, the lower yoke section including a latch-pin structure for selectively locking the rotational position of the collar member by engaging one of the sockets.

4. The apparatus of claim 3, wherein each collar member has two perimetral sockets at 180 degree intervals.

5. The apparatus of claim 3, wherein each collar member has four perimetral sockets at 90 degree intervals.

6. The apparatus of claim 3, wherein each collar member has eight perimetral sockets at 45 degree intervals.

\* \* \* \* \*